US012469975B2

(12) United States Patent
Casazzone et al.

(10) Patent No.: US 12,469,975 B2
(45) Date of Patent: Nov. 11, 2025

(54) PATCH ANTENNA ASSEMBLY WITH PARASITIC PATCH AND CAPACITIVE LOADING ELEMENTS

(71) Applicant: ZEBRA TECHNOLOGIES CORPORATION, Lincolnshire, IL (US)

(72) Inventors: Nicolas F. Casazzone, Dix Hills, NY (US); Charles Burton Swope, Coral Springs, FL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 172 days.

(21) Appl. No.: 18/072,491

(22) Filed: Nov. 30, 2022

(65) Prior Publication Data

US 2024/0178566 A1 May 30, 2024

(51) Int. Cl.
*H01Q 9/04* (2006.01)
*H01Q 21/06* (2006.01)
*H01Q 5/378* (2015.01)

(52) U.S. Cl.
CPC ......... *H01Q 9/0414* (2013.01); *H01Q 9/0407* (2013.01); *H01Q 9/045* (2013.01); *H01Q 21/065* (2013.01); *H01Q 5/378* (2015.01)

(58) Field of Classification Search
CPC .... H01Q 9/0407; H01Q 5/378; H01Q 21/065; H01Q 9/0414; H01Q 9/045
See application file for complete search history.

(56) References Cited

U.S. PATENT DOCUMENTS

| | | | | |
|---|---|---|---|---|
| 7,109,929 | B1 * | 9/2006 | Ryken, Jr. | H01Q 21/0075 343/705 |
| 11,539,139 | B1 * | 12/2022 | Cheng | H01Q 21/0037 |
| 2013/0120213 | A1 * | 5/2013 | Cetiner | H01Q 5/50 343/846 |
| 2019/0115664 | A1 * | 4/2019 | Veihl | H01Q 5/50 |
| 2020/0161767 | A1 * | 5/2020 | Hara | H01Q 9/0414 |
| 2020/0295437 | A1 * | 9/2020 | Ueda | H01Q 9/0407 |
| 2020/0365999 | A1 * | 11/2020 | Edenfield | H01Q 21/065 |
| 2020/0403322 | A1 * | 12/2020 | Ryu | H01Q 21/08 |
| 2021/0242579 | A1 * | 8/2021 | Tsai | H01Q 21/061 |
| 2022/0085502 | A1 * | 3/2022 | Arai | H01Q 9/045 |

(Continued)

FOREIGN PATENT DOCUMENTS

| | | | | |
|---|---|---|---|---|
| EP | 910134 | A2 * | 4/1999 | H01Q 21/0006 |
| EP | 1253669 | A2 * | 10/2002 | H01Q 21/0075 |

*Primary Examiner* — Ab Salam Alkassim, Jr.

(57) ABSTRACT

The disclosure is an antenna device, comprising a substrate layer and a patch antenna assembly on the substrate layer, configured to contain at least one patch antenna element. Each patch antenna element has a feed insertion cutout and a base cutout, where a feed line extending from a feed point on the substrate layer couples to the antenna element in the feed insertion cutout. Each patch antenna element corresponds to a respective parasitic patch element, positioned above the patch antenna element, and a respective capacitive loading element, positioned on the feed line and proximate to the patch antenna element, to improve the performance of the antenna device. Each parasitic pat antenna is larger than its respective patch antenna element. The antenna device may also include a mounting structure to position each parasitic patch element over each patch antenna element.

20 Claims, 17 Drawing Sheets

(56) References Cited

U.S. PATENT DOCUMENTS

| | | | | |
|---|---|---|---|---|
| 2022/0181781 | A1* | 6/2022 | Arai | H01Q 1/2283 |
| 2022/0294108 | A1* | 9/2022 | Zhang | H01Q 1/246 |
| 2023/0006350 | A1* | 1/2023 | Arai | H04B 7/0413 |

* cited by examiner

PATCH ANTENNA ASSEMBLY WITH PARASITIC PATCH AND CAPACITIVE LOADING ELEMENTS

BACKGROUND

Patch antennas typically consist of a geometrical sheet of metal mounted on or above a larger sheet of metal that acts as a ground plane. The low profile of patch antennas makes them an attractive, potential solution for many applications where physical size design constraints limit the space an antenna can occupy in an antenna device or where an antenna device can be deployed. However, typical patch antennas are edge-fed and have a very narrow bandwidth that is unsuitable for some such applications.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
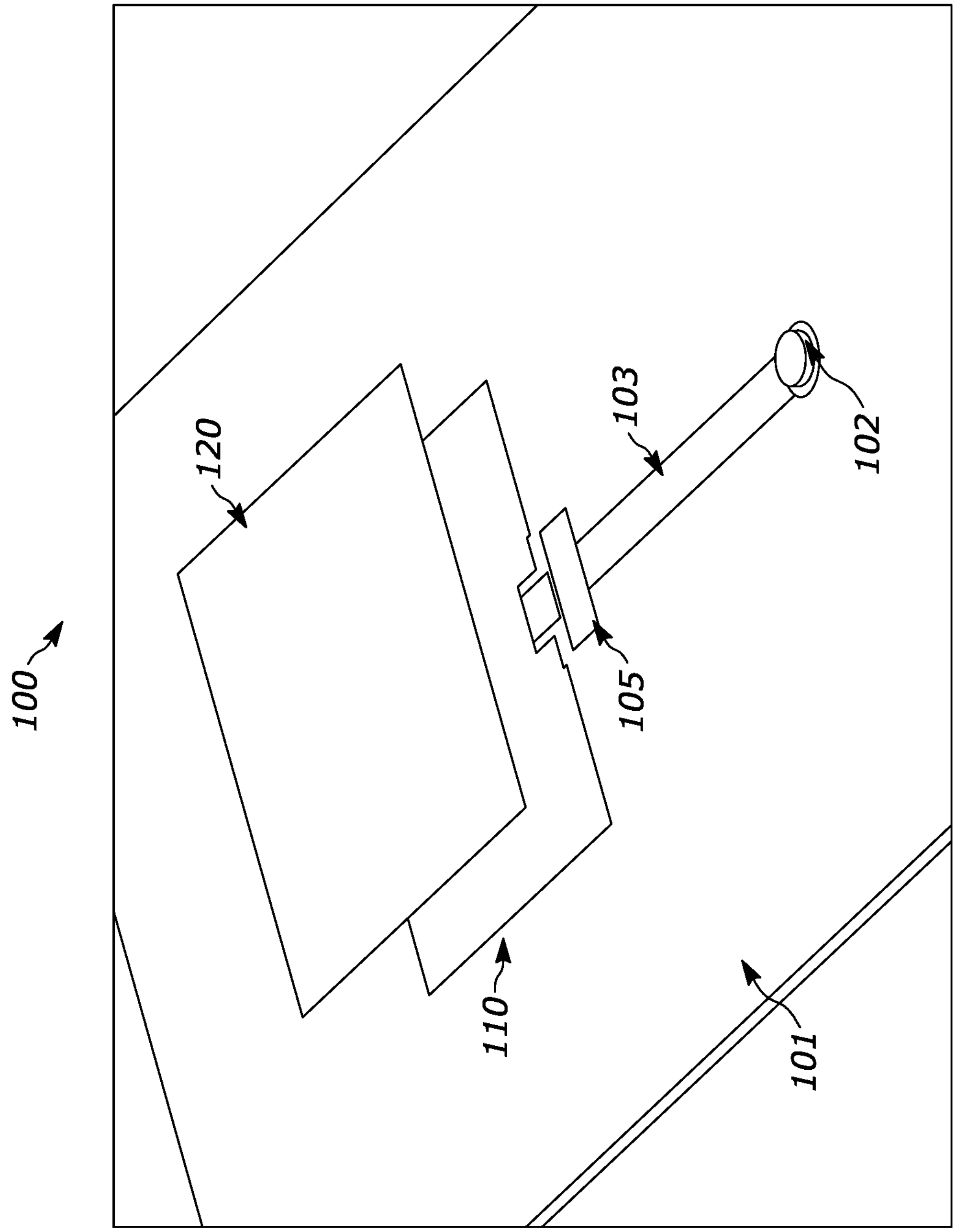
FIG. 1 is a diagram of an example embodiment of the device of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Patch antennas typically have very narrow bandwidth. By placing a parasitic patch element above the radiating element of a patch antenna, the bandwidth of the patch antenna improves. However, in many applications, the addition of a parasitic patch element alone may not provide the required bandwidth for a given use case where the small size profile of a patch antenna is desirable. An antenna device comprised of at least one patch antenna element, at least one parasitic patch element, and at least one capacitive loading element, that achieves an ultra-wideband bandwidth, while maintaining the compact form that patch antennas afford and that design constraints may often require.

Examples disclosed herein are directed to an antenna device, comprising: a substrate layer; a patch antenna assembly on the substrate layer, configured to contain at least one patch antenna element, where each patch antenna element has a first side of a first length, a second side of a second length, a third side of a first width, and a fourth side of a second width, and wherein each patch antenna element has a feed insertion cutout and a base cutout in the first side; a feed point on the substrate layer; a feed line, configured to have a feed line structure, where the feed line structure is comprised of at least one line length; a parasitic patch assembly, configured to contain at least one parasitic patch element, with a fifth side of a third length, a sixth side of a fourth length, a seventh side of a third width, and a seventh side of fourth width, where each parasitic patch element corresponds to a respective patch antenna element, is larger than the respective patch antenna element, and is positioned above the respective patch antenna element; a capacitive loading element, with sides of a fifth length, a sixth length, a fifth width, and a sixth width configured to be positioned on the feed line between ends of a feed line length and proximate to the respective patch antenna element; and, a mounting structure, configured to position the parasitic patch assembly above the patch antenna assembly at a predetermined height.

FIG. 1 illustrates an example embodiment of an antenna device of the present disclosure. An antenna device 100 includes a patch antenna assembly 110 coupled to a substrate layer 101. The antenna device 100 may further include a feed point 102 and a feed line 103, where the feed line 103 extends from the feed point 102 to the patch antenna assembly 110. The antenna device 100 may also include a capacitive loading element 105 positioned on the feed line 103 proximate to the patch antenna assembly 110. The antenna device may include a parasitic patch assembly 120 configured to be positioned above the patch antenna assembly 110.

Figure 2:
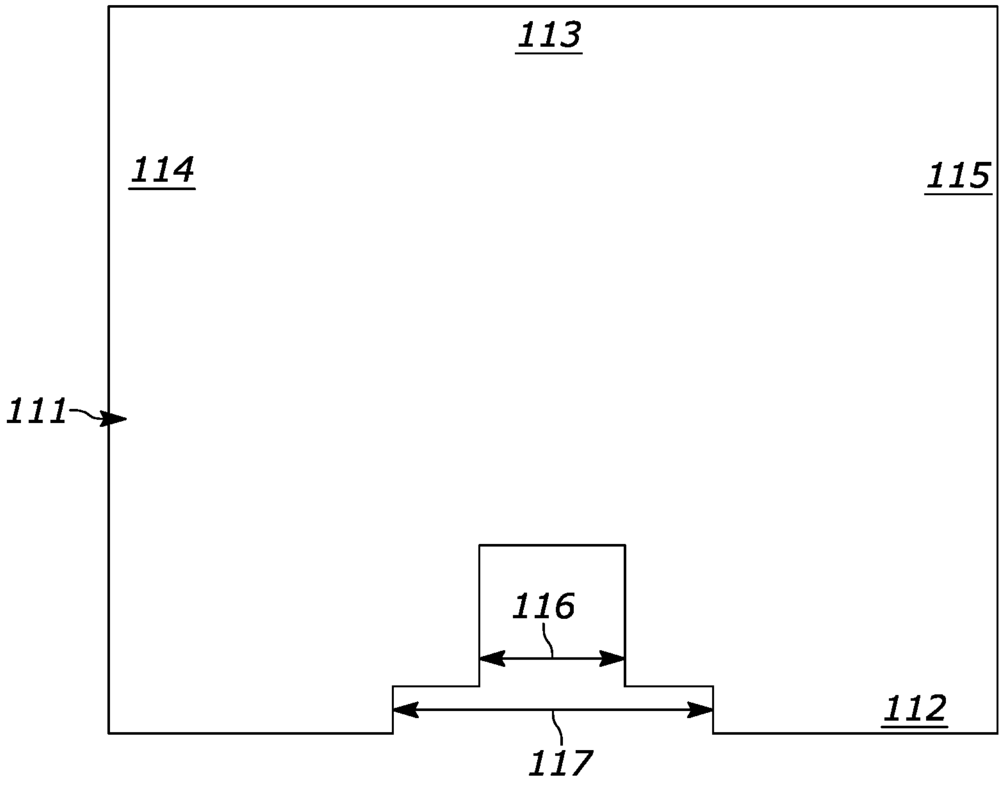
FIG. 2 is a diagram of an example embodiment of a patch antenna element of the present disclosure.

The patch antenna assembly 110 is configured to contain at least one patch antenna element 111. FIG. 2 illustrates an example embodiment of a patch antenna element 111 according to an aspect of the present disclosure. Each patch antenna element 111 has a first side 112 of a first length, a second side 113 of a second length, a third side 114 of a first width, and a fourth side 115 of a second width. Additionally, each patch antenna element 111 may contain a feed insertion cutout 116 and a base cutout 117 along its first side 112. In an embodiment, the feed insertion cutout 116 and the base cutout 117 of each patch antenna element 111 in a patch antenna assembly 110 may be centered with respect to the first side 112 of a first length of each patch antenna element 111.

Figure 3:
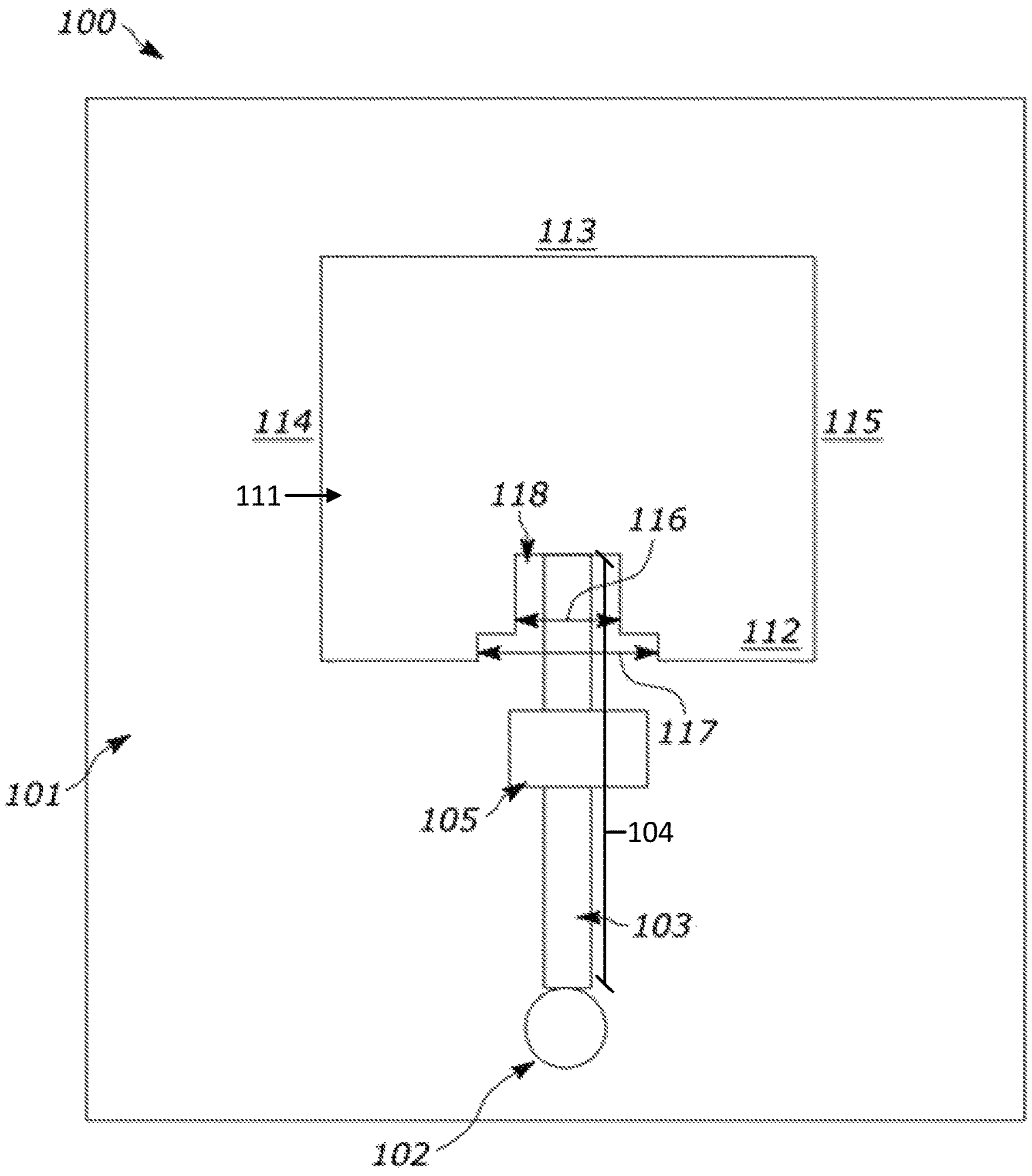
FIG. 3 is a diagram of an example embodiment of a patch antenna element coupled to a feed line extending from a feed point in a substrate layer of the present disclosure.

FIG. 3 illustrates an example embodiment of a patch antenna element 111 and associated feed line 103 and capacitive feed element 105 according to an aspect of the present disclosure. A patch antenna element 111 has a first side of a first length 112, a second side of a second length 113, a third side of a first width 114, and a fourth side of a second width 115. The antenna device 100 may also include a conductive feed line 103, configured into a feed line structure comprised of at least one feed line length that extends from the feed point 102 to one or more patch antenna elements 111 of the patch antenna assembly 110. The feed line structure may be organized in a space-efficient manner to meet physical size constraints for an antenna device 100. The feed line 103 may include multiple branching feed line lengths. The conductive feed line 103 couples to the patch antenna element 111 by extending into the feed insertion cutout 116 of the patch antenna element 111, such that each patch antenna element 111 is center-fed. In embodiments where the patch antenna assembly is configured to contain more than one patch antenna element 111, each patch antenna element is fed by a respective feed line 103 extending into each elements' feed insertion cutout 116.

The feed line structure may be organized so that each feed line 103 coupled to each patch antenna element 111 is equal in phase and so that each patch antenna element 111 is supplied an optimal amount of energy from its feed line 103. The device 100 may also include a spacing 118, as illustrated in FIG. 3, in between the feed insert cutout 116 and base cutout 117 in the first side 112 of the patch antenna element 111 and the feed line 103. In an embodiment of the present disclosure the spacing 118 between the feed line 103 and the patch antenna element 111 within the feed insertion cutout 116 is or is approximately 0.2 mm.

A patch antenna element 111 may contain a feed insertion 116 cutout along its first side 112. The dimensions of the feed insertion cutout 116 are such that the reflection from the feed line 103 is minimized. The feed insertion cutout 116 in each patch antenna element 111 allows for the coupling of the respective feed line 103 to each respective patch antenna element 111 in the patch antenna assembly 110.

Additionally, a patch antenna element may also contain a base cutout along 117 its first side 112. The base cutout 117 helps reduce the capacitive feed coupling and allows a capacitive loading element 105 to be placed close to the patch antenna element 111 to improve the bandwidth of the antenna device 100.

The antenna device 100 may also include a capacitive loading element 105, with sides of a fifth length, a sixth length, a fifth width, and a sixth width, configured to be positioned on the feed line 103 between ends of a feed line length and proximate to a respective patch antenna element 111. For every patch antenna element 111 in the patch antenna assembly 110, the present disclosure provides for a respective capacitive loading element 105 positioned on the respective feed line 103 for each patch antenna element 111. In an example embodiment of the present disclosure, each capacitive loading element 105 is configured in such a way that it can be moved on the feed line either toward the base cutout 117 of the respective patch antenna element 111 or towards the feed point 102 for the purposes of tuning the antenna device 100. The capacitive loading element may be wider than the feed insertion cutout 116 and may be narrower than the base cutout 117. Additionally, in another example embodiment of the present disclosure, the capacitive loading element 105 may be a section of microstrip or other means integrated into the respective feed line 103 for each patch antenna element 111.

Figure 4:
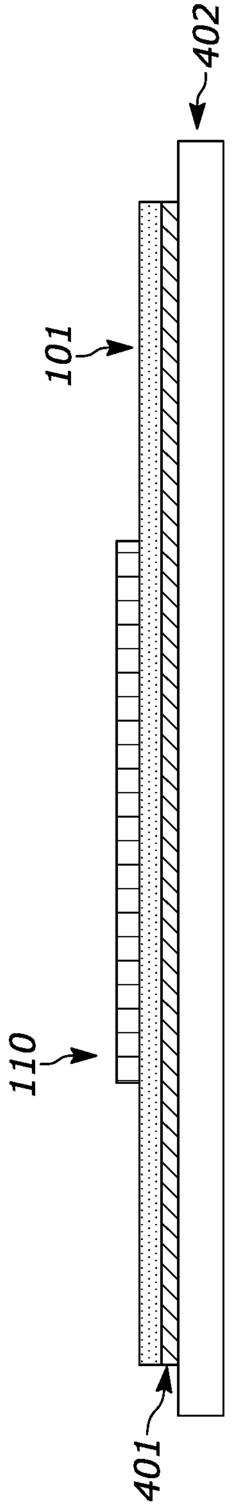
FIG. 4 is a diagram of an example embodiment of a patch antenna element, substrate layer, and conductive base of the present disclosure.

FIG. 4 illustrates an example embodiment of an antenna device 100 of the present disclosure, wherein the substrate layer 101 is configured to be coupled to a conductive base plate 401. The base conductive plate 401 may be a thin conductive plating made of conducting material, such as copper, coupled to the bottom of the substrate layer 101. The bottom of the substrate layer 101 is opposite from a top of the substrate layer 101 where the patch antenna assembly 110 is positioned. The base conductive plate 401 may also be configured to contact a larger conductive back plate 402 of a larger mechanical housing for the antenna device 100.

Figure 5:
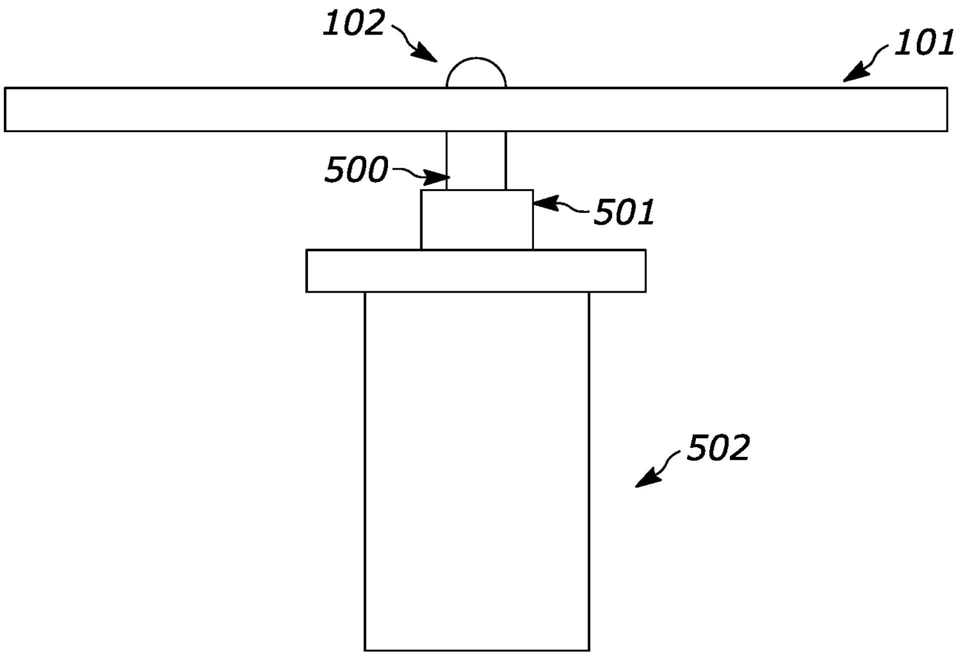
FIG. 5 is a diagram of an example embodiment of a feed point of the present disclosure coupled to a coaxial feed.

FIG. 5 illustrates a feed point 102 according to an aspect of the present disclosure. A feed point 102 may be a hole drilled into the substrate layer 101 (and in some embodiments, drilled into the substrate layer 101, conductive base plate 401, and conductive back plate 402) that is flooded with solder in order to connect the substrate layer 101 to an SMA feed. The SMA feed may be configured to have a coaxial center feed 500, a coax dielectric 501, and a coax outer sheath 502 to supply power to the patch antenna assembly 110 through the feed line 103 extending from the feed point 102. The feed point 102 may be positioned in the center of the substrate layer 101.

Figure 6A:
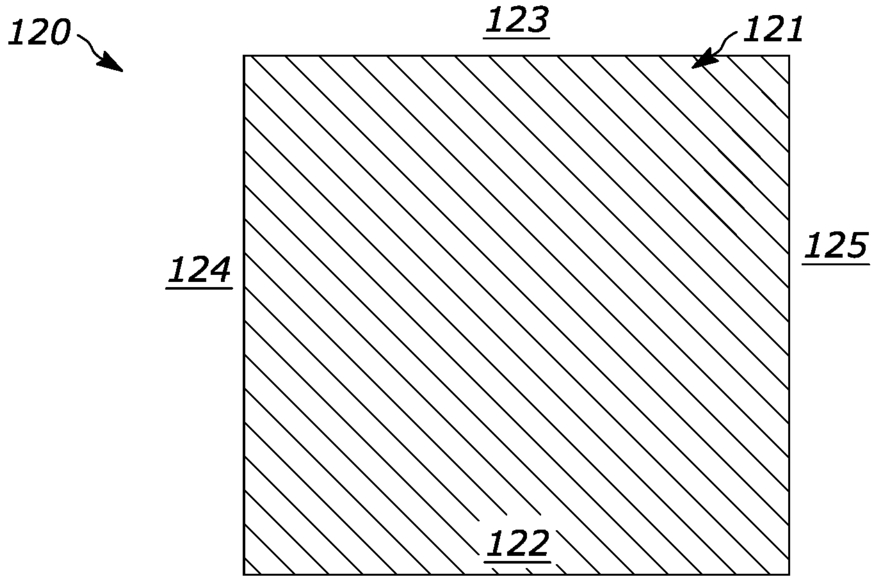
FIGS. 6*a* and 6*b* are diagrams of an example embodiment of a parasitic patch element of the present disclosure.
Figure 6B:
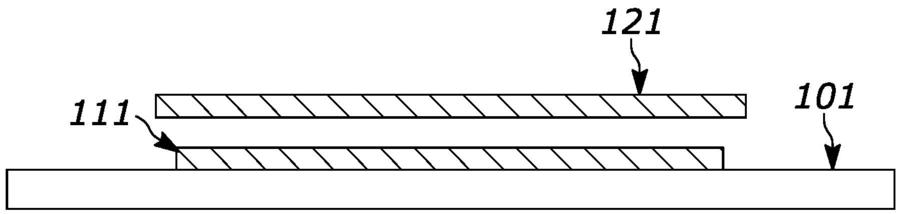

FIGS. 6*a* and 6*b* illustrate an example embodiment of a parasitic patch element 121 and its relation to a patch antenna element 111 according to an aspect of the present disclosure. The antenna device 100 also may contain a parasitic patch assembly 120. The parasitic patch assembly 120 is configured to contain at least one parasitic patch element 121. Each parasitic patch element may have a fifth side 122 of a third length, a sixth side 123 of a fourth length, a seventh side 124 of a third width, and an eighth side 125 of a fourth width, as illustrated in FIG. 6*a*. Additionally, for each parasitic patch element 121 within the parasitic patch assembly 120, the present disclosure provides for a respective patch antenna element 111, over which the respective parasitic patch element 121 is positioned, as illustrated in FIG. 6*b*.

In an example embodiment of the present disclosure, each parasitic patch element 121 is larger than the corresponding patch antenna element 111. For example, sides 124, 125 of the parasitic patch element 121 may each be 2 mm longer than the sides of the corresponding patch antenna element 111. In such example, the seventh and eighth sides 124, 125 of the parasitic patch element 111 may be 1 mm longer past the edge of the first side 112 and 1 mm longer past the edge of the second side 113 of the corresponding patch antenna element 111. In an example embodiment of the present disclosure, each parasitic patch element 121 is larger than each respective patch antenna element 111 and hangs over each respective patch antenna element 111 in a way that each parasitic patch element 120 also slightly overlaps each respective capacitive loading element 105. This overlap of the parasitic patch element 121 with the patch antenna element 111 and capacitive loading element 105 is part of the impedance matching effort to achieve ultra-wideband performance of an antenna device 100.

Figure 7A:
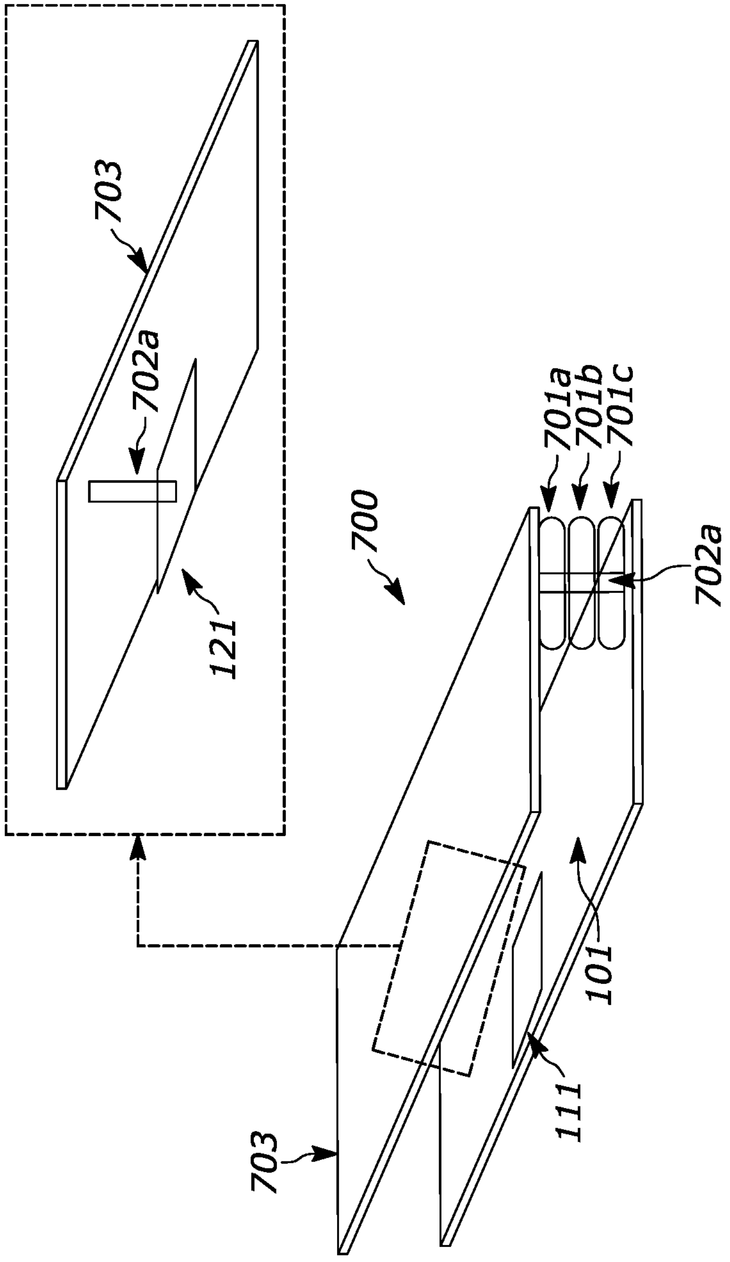
FIGS. 7*a* and 7*b* are diagrams of an example embodiment of a mounting structure of the present disclosure from different perspectives.
Figure 7B:
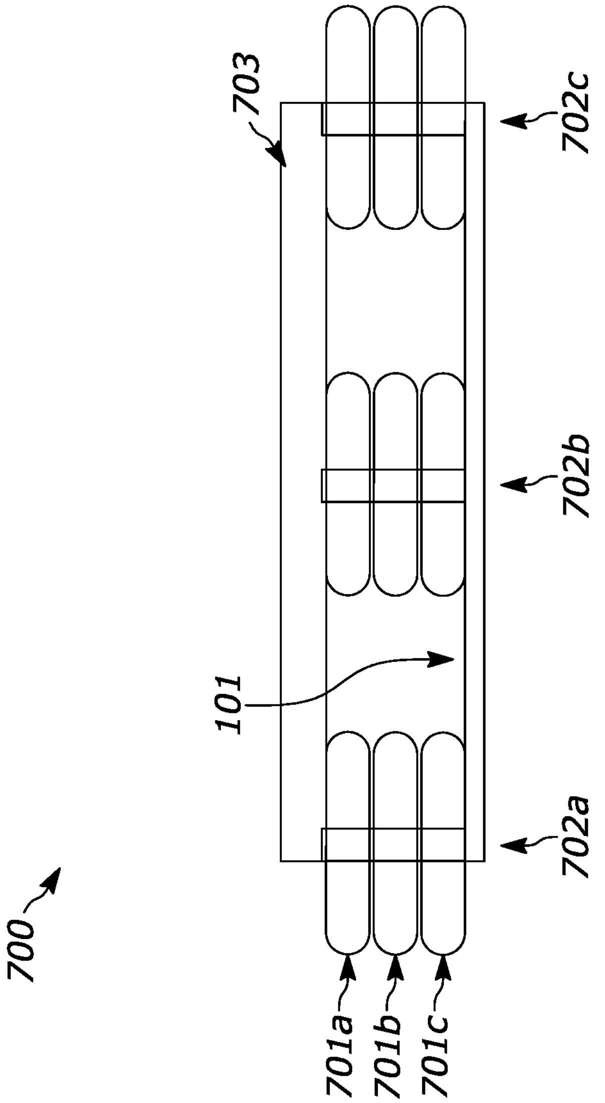

FIGS. 7*a* and 7*b* illustrate an example mounting structure 700 for an example embodiment of an antenna device 100 of the present disclosure. An antenna device 100 may also include a mounting structure 700 configured to position a parasitic patch element 121 of the parasitic patch assembly 120 in place above a respective patch antenna element 111 of the patch antenna assembly 110 at a predetermined height.

In an embodiment of the present disclosure, the mounting structure 700 is comprised of at least one nylon washer 701*a-c* and at least one nylon screw 702*a-c*. Nylon screws 702*a-c* are placed into the substrate layer 101 with nylon washers 701*a-c* then being distributed around the nylon screws 702*a-c*, as illustrated in FIGS. 7*a* and 7*b*. The thickness and number of washers 701*a-c* depends on the desired predetermined height. Additionally, the spacing between the parasitic patch element 121 and the patch antenna element 111 can be determined based on the impedance matching needed to ensure ultra-wideband performance, as the impedance matching of the antenna device 100 is very sensitive to this spacing.

In one example embodiment, the mounting structure 700 further includes a mounting base 703, as illustrated in FIGS. 7*a* and 7*b*. The mounting base 703 may include an aluminum sheet covered with a PTFE plastic cover with a thickness of or about 2 mm and a dielectric constant of or about 3.0. Three nylon screws 702*a-c* are inserted into the substrate layer 101 and connect the substrate layer 101 with the mounting base 700, and a nylon washer 701*a-c* with a thickness of or about 3.175 mm is placed around each nylon screw 702*a-c*, such that the thickness of the washer corresponds with achieving the desired, predetermined height between patch antenna elements 111 and their respective parasitic patch elements 121. The predetermined height may correspond to the spacing required between the patch antenna elements and parasitic patch elements to achieve impedance matching that results in ultra-wide band functionality. In some embodiments this spacing is achieved through several washers, where the number of washers is dependent on the predetermined height of the parasitic patch over the patch antenna element. Through the implementation of the mounting structure 700, a parasitic patch element 121 is held above each patch antenna element 111 at a predetermined height that allows for sufficient impedance matching for ultra-wideband performance and the desired radiation pattern for the given application.

Figure 8:
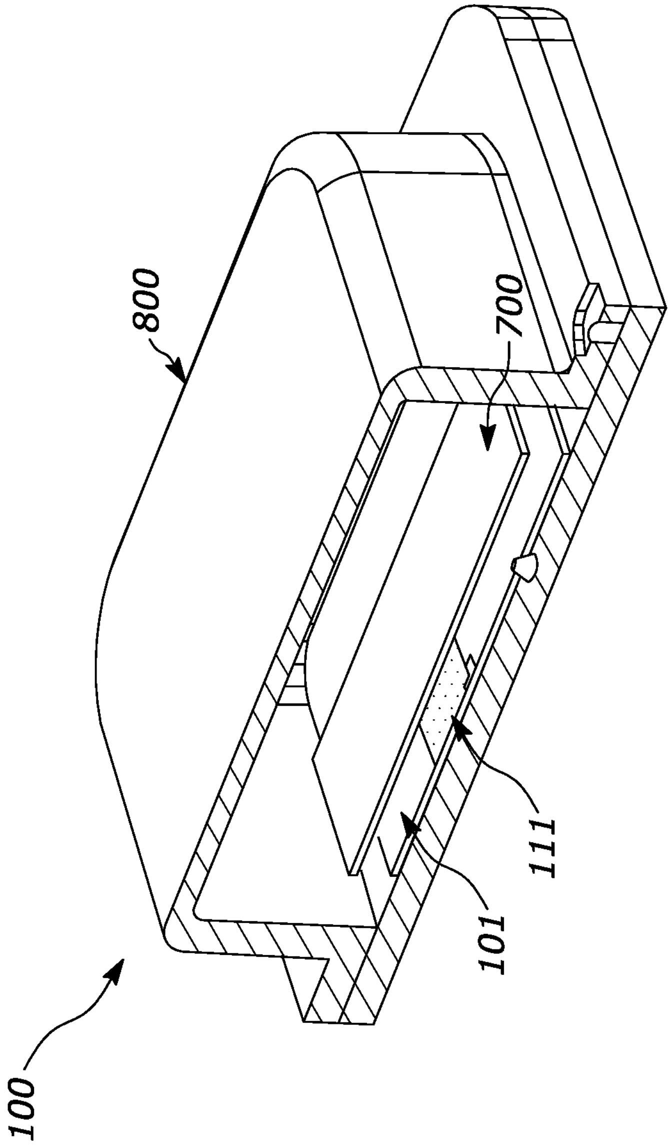
FIG. 8 is a diagram of an example embodiment of the present disclosure that contains a radome.

FIG. 8 illustrates an embodiment of an antenna device 100 of the present disclosure that includes integrating the mounting structure 700 into a larger mechanical housing such as a radome 800. In some embodiments of the present disclosure, the radome 800 is designed to be affixed to the bottom of an elevated tier of seats in a stadium.

Figure 9:
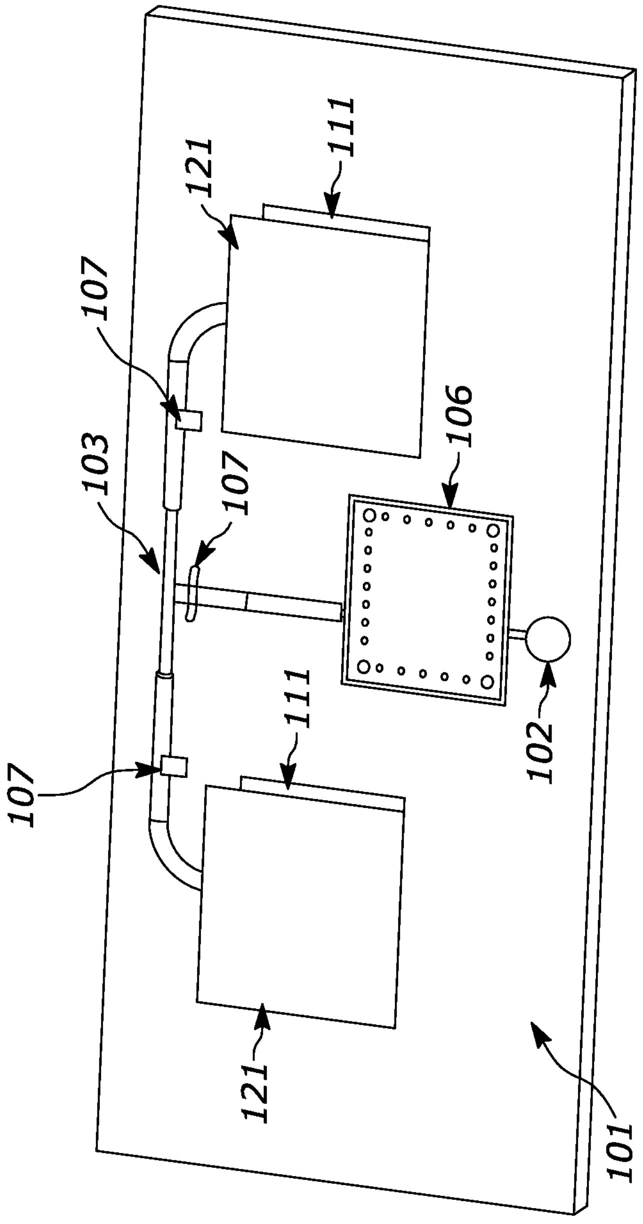
FIG. 9 is a diagram of an example embodiment of the device of the present disclosure that contains two patch antenna elements.

FIG. 9. illustrates an example embodiment of the present disclosure. An antenna device 100 may include a patch antenna assembly 110 with two patch antenna elements 111 and a parasitic patch assembly 120 with two parasitic patch elements 121. An antenna device may also include a strip-line filter module 106. The strip-line filter module 106 may be integrated into the feed structure of the feed line 103 to provide a more compact design while still optimizing impedance matching such that the amount of energy supplied to each patch antenna element 111 in the patch antenna assembly 110 is optimized. An antenna device 100 may also include a plurality of tuning stubs 107 disposed throughout the feed structure to optimize impedance matching within the feed line for ultra-wideband performance. The feed structure may also be optimized with respect to impedance matching and the spacing between patch antenna elements 111. Additionally the feed structure of the feed line 103 may be equal in phase in order to align the phase between the patch antenna elements 111 in the patch antenna assembly 110. The feed structure may also utilize feed line lengths that function as impedance transformers in the optimization of mentioned properties of the antenna device 100.

Figure 10:
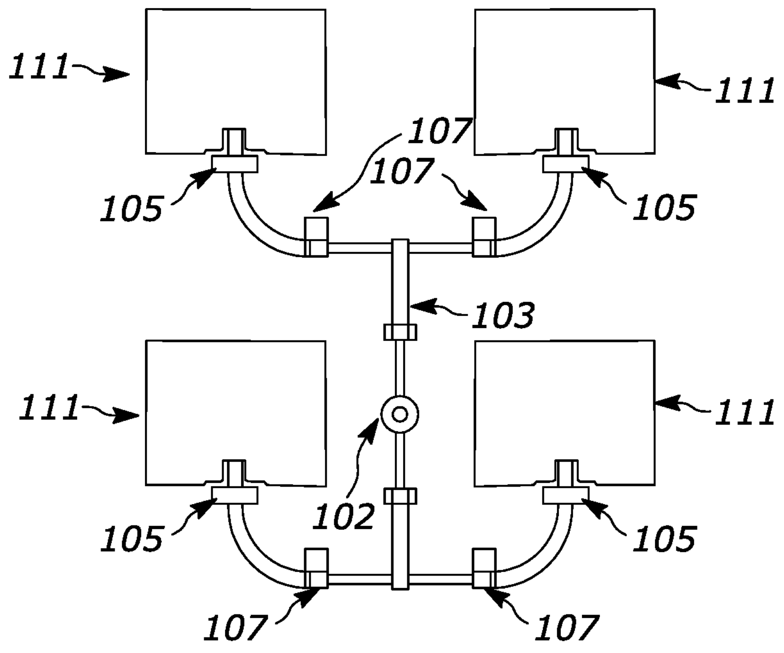
FIG. 10 is a diagram of an example embodiment of the device of the present disclosure that contains four patch antenna elements.

FIG. 10 is a diagram of an example embodiment of the antenna device 100 of the present disclosure that contains four patch antenna elements 111. As shown in FIG. 10, the patch antenna assembly 110 is configured to consist of four patch antenna elements 111, four respective parasitic patch elements 121, and four respective capacitive loading elements 105. Additionally, the example antenna device 100 may also include a plurality of tuning stubs 107 disposed throughout the feed structure. The feed structure may also utilize impedance transformers. These tuning stubs 107 and impedance transformers may be designed for ultra-wideband applications such that they optimize the spacing of the patch antenna elements 111, as well as the S-parameters of the antenna device 100. The feed structure may also be optimized for to allow for spacing adjustments between the patch antenna elements 111 to tune the beamwidth of the antenna device 100.

Figure 11:
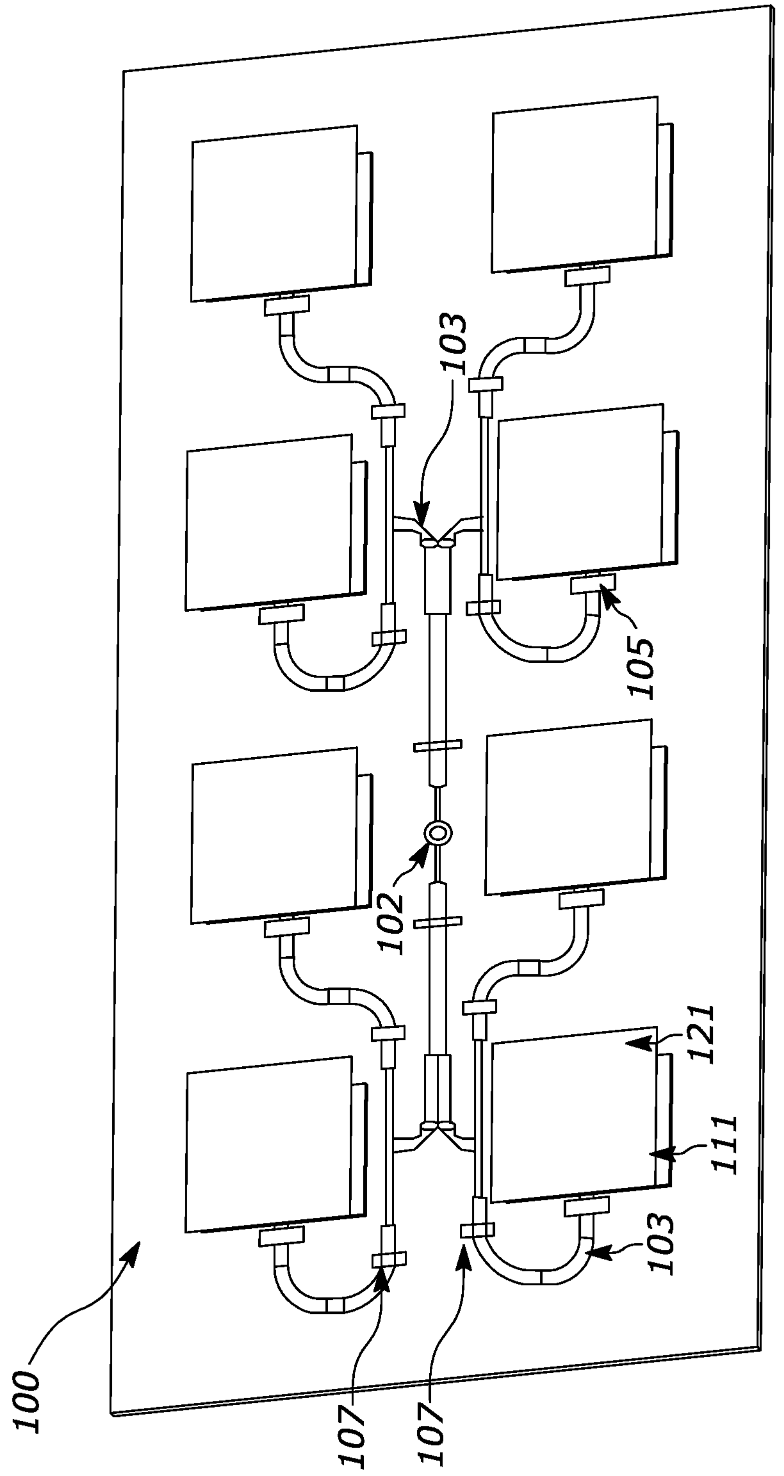
FIG. 11 is a diagram of an example embodiment of the device of the present disclosure that contains eight patch antenna elements.

FIG. 11 is a diagram of an example embodiment of the antenna device 100 of the present disclosure that contains eight patch antenna elements 111. As shown in FIG. 11, the patch antenna assembly 110 is configured to consist of eight patch antenna elements 11, eight respective parasitic patch elements 121, and eight respective capacitive loading elements 105. The feed structure may contain the tuning stubs 107 and impedance transformers mentioned above to optimize different characteristics of the antenna device 100. Additionally, as illustrated by the feed line 103 of FIG. 11, the feed structure may also contain feed line lengths that are chamfered, as opposed to rolling. The feed structure may also be optimized for to allow for spacing adjustments between the patch antenna elements 111 to tune the beamwidth of the antenna device 100.

Figure 12:
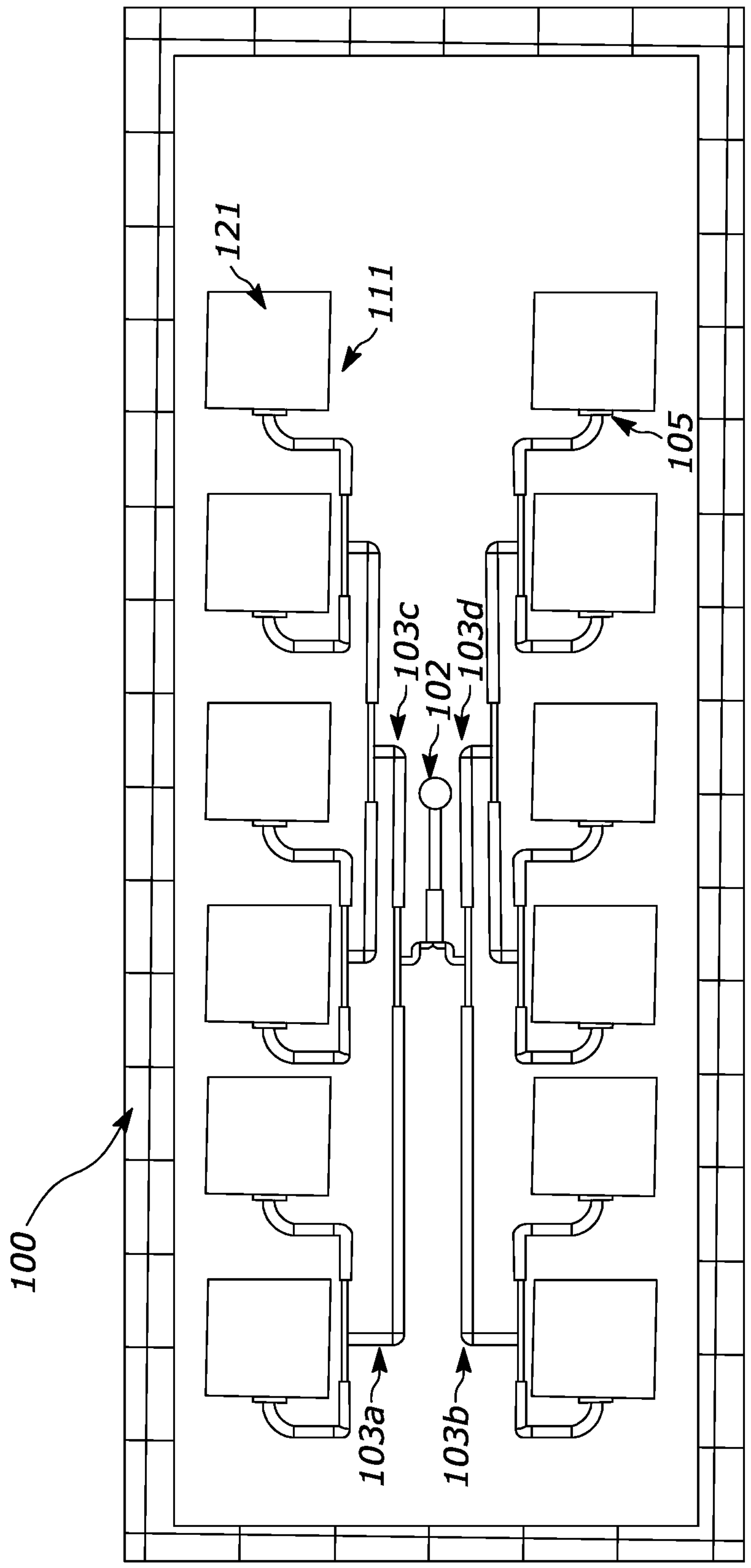
FIG. 12 is a diagram of an example embodiment of the device of the present disclosure that contains twelve patch antenna elements.

FIG. 12 is a diagram of an example embodiment of the antenna device 100 of the present disclosure that contains twelve patch antenna elements 111. As shown in FIG. 12, the patch antenna assembly 110 is configured to consist of twelve patch antenna elements 111, twelve respective parasitic patch elements 121, and twelve respective capacitive loading elements 105. The feed structure may contain the tuning stubs 107, impedance transformers, and chamfered feed line lengths, as mentioned above, to optimize different characteristics of the antenna device 100. The feed line structure may be organized such that the power supplied at the feed point 102 is split unevenly. For example, as illustrated in FIG. 12, the feed line may first be split in two before being split into four feed lines 103*a-d*. As such, feed lines 103*a* and 103*b* supply power to two patch antenna elements 111 each, while feed lines 103*c* and 103*d* supply power to four patch antenna elements 111 each. The feed structure of the antenna device 100 results in an asymmetrical split of power among the patch antenna elements 111. Therefore, the feed structure and spacing of patch antenna elements 111 on the substrate layer 101, may be optimized to achieve the bandwidth required for ultra-wideband performance and the desired beamwidth.

Figure 13:
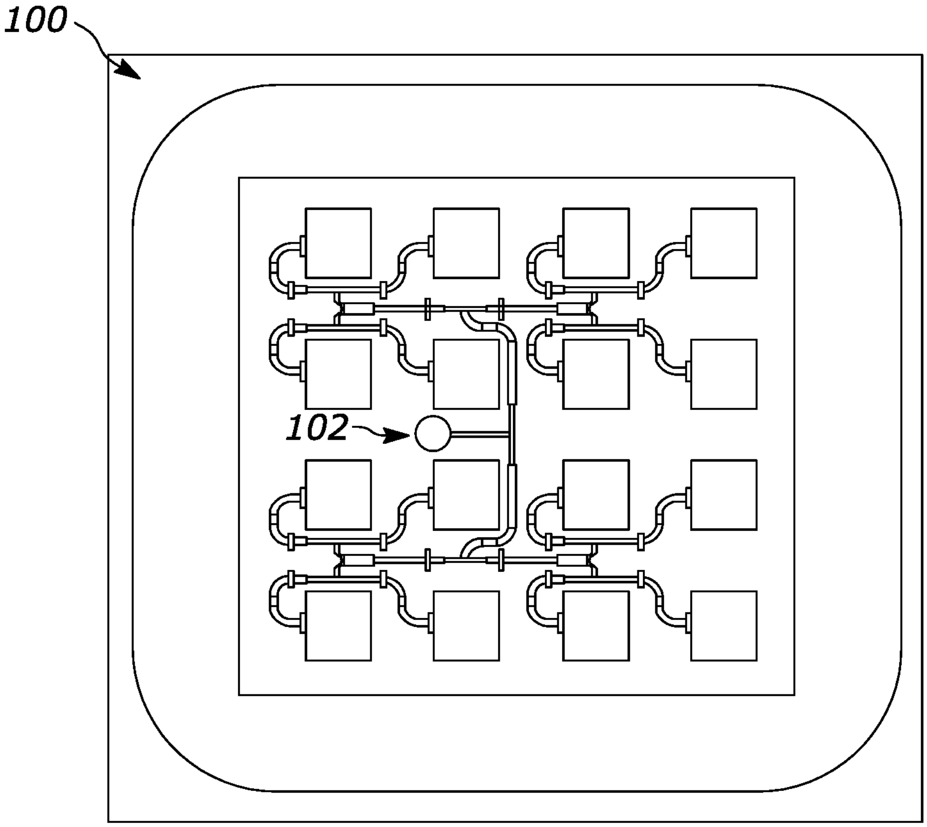
FIG. 13 is a diagram of an example embodiment of the device of the present disclosure that contains sixteen patch antenna elements configured in a square formation.

FIG. 13 is a diagram of an example embodiment of the antenna device 100 of the present disclosure that contains sixteen patch antenna elements 111. As shown in FIG. 13, the patch antenna assembly 110 is configured to consist of sixteen patch antenna elements 111, sixteen respective parasitic patch elements 121, and sixteen respective capacitive loading elements 105. The feed structure of the antenna device 100 may contain the tuning stubs 107, impedance transformers, and chamfered feed line lengths, as mentioned above, to optimize different desired characteristics, such a desired, particular beamwidth for a certain application, of the antenna device 100. The patch antenna elements 111 (and respective parasitic patch elements 121 and capacitive loading elements 105) are laid out in two groups of eight. As illustrated in FIG. 13, the groups of eight may be laid out in a square formation with the groups of eight located on opposite sides of the feed point 102 of each other. The spacing between these groups of eight patch antenna elements 111 (and accompanying parasitic patch elements 121 and capacitive loading elements 105) and the feed point 102 may be adjusted to tune the beamwidth of the antenna device 100.

Figure 14:
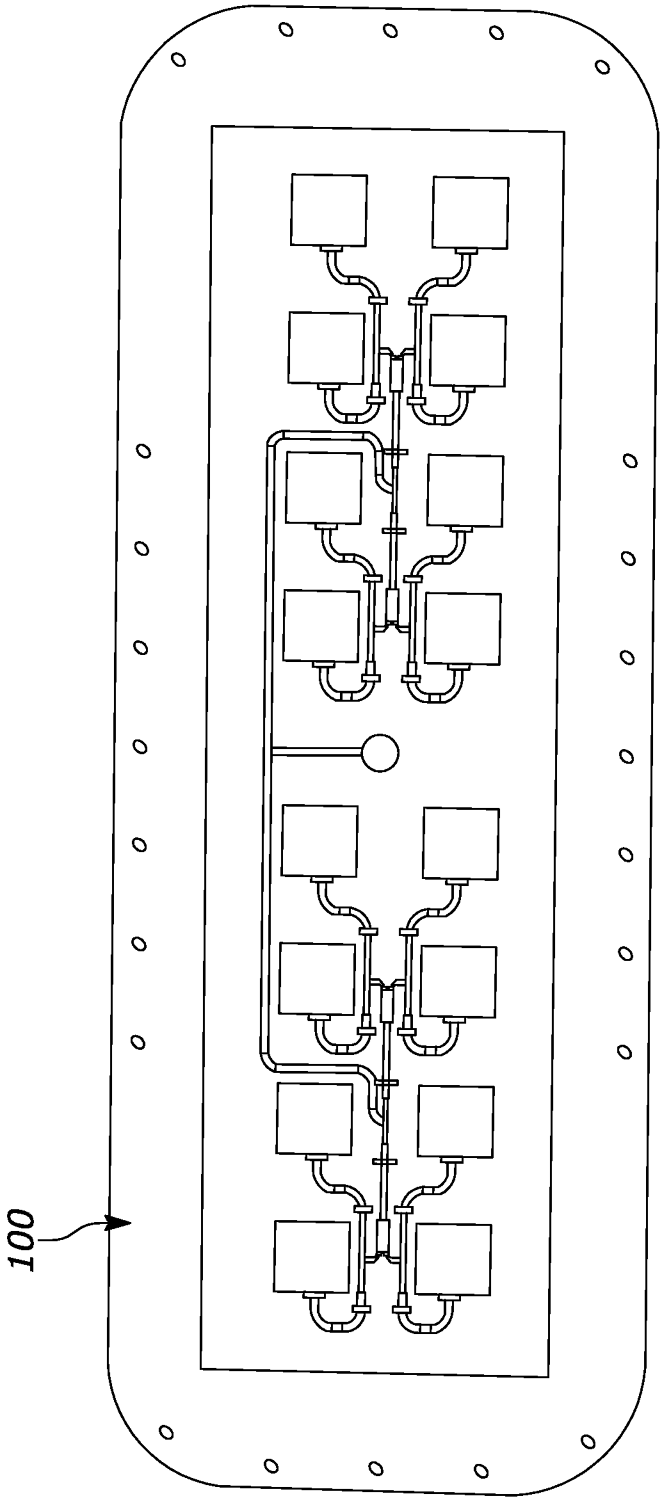
FIG. 14 is a diagram of an example embodiment of the device of the present disclosure that contains sixteen patch antenna elements configured in a line formation.

FIG. 14 is a diagram of an example embodiment of the antenna device 100 of the present disclosure that contains sixteen patch antenna elements 111. As shown in FIG. 14, the patch antenna assembly 110 is configured to consist of sixteen patch antenna elements 111, sixteen respective parasitic patch elements 121, and sixteen respective capacitive loading elements 105. The feed structure may contain the tuning stubs 107, impedance transformers, and chamfered feed line lengths, as mentioned above, to optimize different desired characteristics, such a desired, particular beamwidth for a certain application, of the antenna device 100. The patch antenna elements 111 (and respective parasitic patch elements 121 and capacitive loading elements 105) are laid out in two groups of eight. As illustrated in FIG. 14, the groups of eight may be laid out in a line formation with the groups of eight located on opposite sides of the feed point 102 of each other. The spacing between these groups of eight patch antenna elements 111 (and accompanying parasitic patch elements 121 and capacitive loading elements 105) and the feed point 102 may be adjusted in order to tune the beamwidth of the antenna device 100. Different physical space constraints provide different example embodiments with additional advantages. For example, the patch antenna element layout illustrated in FIG. 14 may be more easily installed in a location for a certain application as compared to the patch antenna element layout illustrated in FIG. 13.

Additionally, different applications of the antenna device 100 may require the use of different example embodiments of the antenna device 100. For example, an antenna device 100 for use in a sports stadium may benefit from using one embodiment over another embodiment based on the area of the stadium or playing field the antenna is located and the area for which the antenna device 100 is operated to cover.

Figure 15:
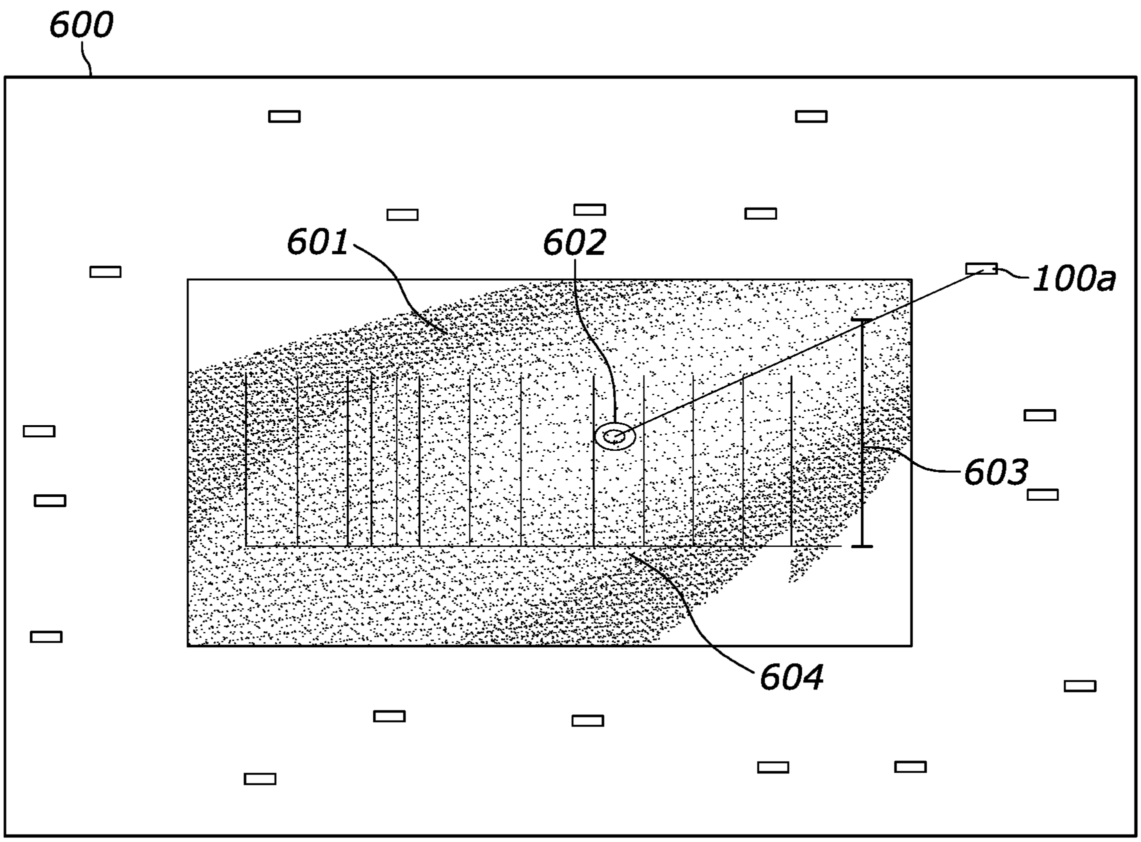
FIG. 15 is a diagram of the radiation pattern of an example embodiment of the device of the present disclosure that contains four patch antenna elements projected onto a playing field.
Figure 16:
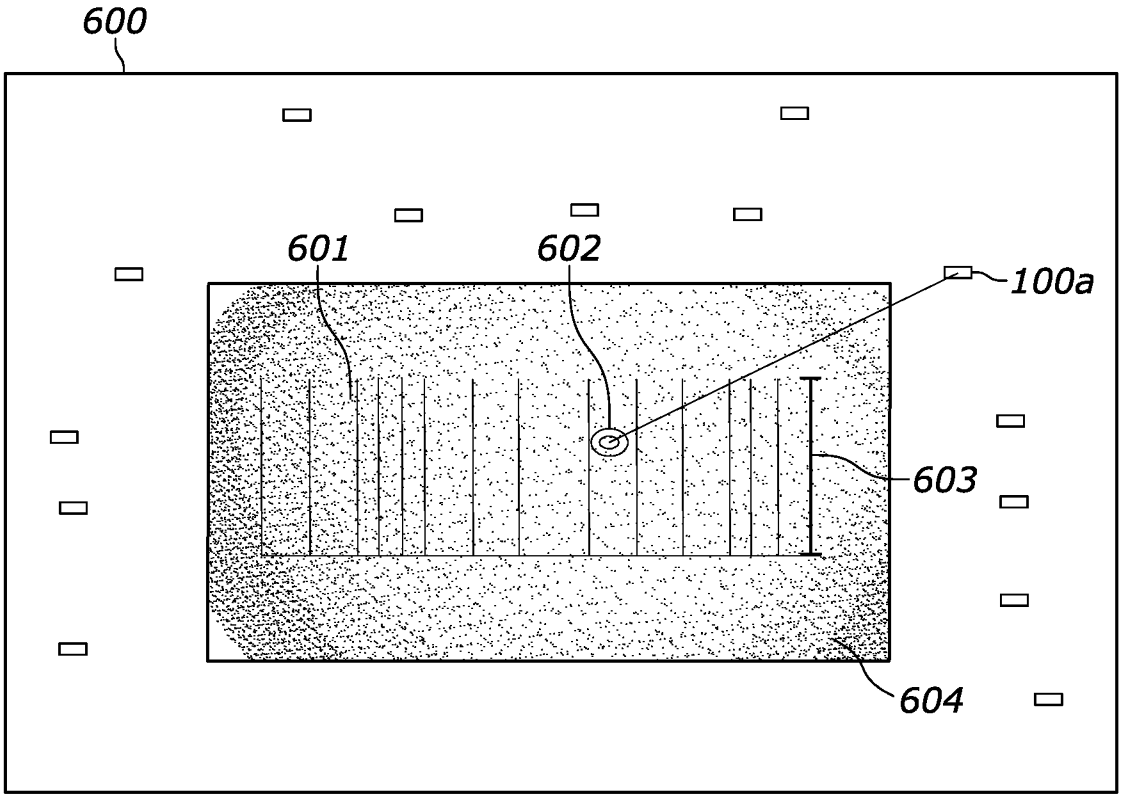
FIG. 16 is a diagram of the radiation pattern of an example embodiment of the device of the present disclosure that contains sixteen patch antenna elements projected onto a playing field.

FIGS. 15 and 16 illustrate the radiation patterns of examples of an antenna device 100 of the present disclosure projected onto a playing field 601 from the antenna devices location in a stadium 600. Each radiation pattern contains a main beam pattern 604, and within each main beam pattern 604, darker areas correspond to areas of higher gain. In FIG. 15, the antenna device **100*a* is positioned at a location in the stadium 600 to radiate onto the playing field 601 toward a target 602. The antenna device 100*a* contains a patch antenna assembly 110 that is configured to include four patch antenna elements 111 and a parasitic patch assembly 120 with four parasitic patch elements 121. The antenna device 100*a* radiates according to the radiation pattern illustrated by the main beam pattern 604 in FIG. 15. The gain provided by the antenna device 100*a* may supply sufficient coverage for a portion of the playing field 601, for example, part of an end zone 603 of a football field. However, this coverage may not be enough to provide the required antenna functionality needed for a certain application. For example, the antenna device 100*a* in FIG. 15 may not provide a sufficient coverage area/gain to track an RFID tag attached to a player moving down the full length of the end zone 603 of the playing field 601**.

In FIG. 16, the antenna device **100*a* is positioned at a location in the stadium 600 to radiate onto the playing field 601 toward a target 602. The antenna device 100*a* contains a patch antenna assembly 110 that is configured to include sixteen patch antenna elements 111 and a parasitic patch assembly 120 with sixteen parasitic patch elements 121. The antenna device 100*a* radiates according to the radiation pattern illustrated by the main beam pattern 604 in FIG. 16. The radiation pattern of the antenna device 100*a* provides for greater coverage of an area of the playing field, such as an entire end zone 603, than the device in FIG. 15. Therefore, the antenna device 100*a* of FIG. 16 may be a more advantageous solution in the application of tracking RFID tags attached to players moving in an area of a playing field 601 than FIG. 15**.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. An antenna device comprising:
- a substrate layer;
- a patch antenna assembly on the substrate layer, configured to contain at least one patch antenna element, wherein
  - each patch antenna element has a first side of a first length, a second side of a second length, a third side of a first width, and a fourth side of a second width,
  - each patch antenna element contains a feed insertion cutout in the first side, and
  - each patch antenna element contains a base cutout in the first side;
- a feed point on the substrate layer;
- a feed line, configured to have a feed line structure wherein the feed line structure is comprised of at least one feed line length;
- a parasitic patch assembly, configured to contain at least one parasitic patch element, with a fifth side of a third length, a sixth side of a fourth length, a seventh side of a third width, and an eighth side of a fourth width, wherein
  - each parasitic patch element corresponds to a respective patch antenna element,
  - each parasitic patch element is larger than the respective patch antenna element, and
  - each parasitic patch element is positioned above the respective patch antenna element;
- a capacitive feed element, with sides of a fifth length, a sixth length, a fifth width, and a sixth width configured to be positioned on the feed line between ends of a feed line length and proximate to the respective patch antenna element;
- a mounting structure, configured to position the parasitic patch assembly above the patch antenna assembly at a predetermined height; and
- a plurality of tuning stubs disposed along the feed line, an impedance transformer, and a strip-line filter module.

2. The device of claim 1, wherein
- the patch antenna assembly is configured to be an array of two patch antenna elements, and
- the parasitic patch assembly is configured to be an array of two parasitic patch elements.

3. The device of claim 1, wherein
- the patch antenna assembly is configured to be an array of four patch antenna elements, and
- the parasitic patch assembly is configured to be an array of four parasitic patch elements.

4. The device of claim 1, wherein
- the patch antenna assembly is configured to be an array of eight patch antenna elements, and
- the parasitic patch assembly is configured to be an array of eight parasitic patch elements.

5. The device of claim 1, wherein
- the patch antenna assembly is configured to be an array of twelve patch antenna elements, and
- the parasitic patch assembly is configured to be an array of twelve parasitic patch elements.

6. The device of claim 1, wherein
- the patch antenna assembly is configured to be an array of sixteen patch antenna elements, and
- the parasitic patch assembly is configured to be an array of sixteen parasitic patch elements.

7. The device of claim 6, wherein the patch antenna elements are arranged in two sets of eight patch antenna elements arranged in a line formation, wherein
- each set of eight patch antenna elements is laid out as two sequential rows of four patch antenna elements, and
- the sets are arranged on opposite sides of the feed point from each other.

8. The device of claim 6, wherein the patch antenna elements are arranged in two sets of eight patch antenna elements arranged in a square formation, wherein the sets are arranged on opposite sides of the feed point from each other.

9. The device of claim 1, further comprising a conductive base, having a surface, wherein the substrate layer is configured to cover the surface of the conductive base.

10. The device of claim 1, wherein each patch antenna element is center fed.

11. The device of claim 1, wherein each patch antenna element has a respective capacitive feed element.

12. The device of claim 1, wherein the position of the capacitive feed element on the feed line is configured such that the capacitive feed element partially overlaps a respective parasitic patch element by its position under the fifth side of the respective parasitic patch element.

13. The device of claim 1, wherein the capacitive feed element is positioned on the feed line at a predetermined distance from the base cutout on the first side of a patch antenna element to achieve a required bandwidth.

14. The device of claim 1, wherein the capacitive feed element is wider than the feed insertion cutout and narrower than the base cutout.

15. The device of claim 1, wherein capacitive feed element is incorporated into the feed line.

16. The device of claim 1, wherein the feed line is composed of multiple branching feed line lengths.

17. The device of claim 1, wherein the feed line is configured to be in phase throughout the feed line structure.

18. The device of claim 1, wherein the feed line structure includes chamfered lines.

19. The device of claim 1, wherein the feed point is in a center of the substrate layer.

20. The device of claim 1, further comprising a radome.

* * * * *